United States Patent
Adkinson et al.

(10) Patent No.: US 10,618,985 B2
(45) Date of Patent: Apr. 14, 2020

(54) HALOGENATED POLYISOOLEFINS WITH REDUCED HALOGENATED OLIGOMERS

(71) Applicant: ARLANXEO Singapore Pte. Ltd., Singapore (SG)

(72) Inventors: Dana K. Adkinson, London (CA); Sarah Elliott, Bright (CA)

(*) Notice: Subject to any disclaimer, the term of this patent is extended or adjusted under 35 U.S.C. 154(b) by 37 days.

(21) Appl. No.: 15/560,717

(22) PCT Filed: Mar. 3, 2016

(86) PCT No.: PCT/CA2016/050229
§ 371 (c)(1),
(2) Date: Sep. 22, 2017

(87) PCT Pub. No.: WO2016/149802
PCT Pub. Date: Sep. 29, 2016

(65) Prior Publication Data
US 2018/0079840 A1   Mar. 22, 2018

(30) Foreign Application Priority Data

Mar. 25, 2015 (EP) .................................. 15160888

(51) Int. Cl.
*C08F 8/22* (2006.01)
*C08K 5/098* (2006.01)
*C08L 9/00* (2006.01)

(52) U.S. Cl.
CPC .............. *C08F 8/22* (2013.01); *C08K 5/098* (2013.01); *C08L 9/00* (2013.01); *C08F 2800/20* (2013.01); *C08L 2201/08* (2013.01); *C08L 2203/02* (2013.01)

(58) Field of Classification Search
CPC .............. C08F 8/22; C08K 5/098; C08L 9/00
See application file for complete search history.

(56) References Cited

U.S. PATENT DOCUMENTS

| | | | |
|---|---|---|---|
| 2,356,128 A | 8/1944 | Thomas et al. | |
| 2,701,895 A | 2/1955 | Tawney et al. | |
| 3,093,613 A | 6/1963 | Fusco et al. | |
| 3,165,496 A | 1/1965 | Fusco et al. | |
| 3,562,804 A | 2/1971 | Powers et al. | |
| 4,104,218 A | 8/1978 | Hous | |
| 4,130,519 A * | 12/1978 | Roper | C08K 3/22 524/110 |
| 5,886,106 A | 3/1999 | Sumner et al. | |
| 5,889,123 A * | 3/1999 | Schubart | B60C 1/0008 156/110.1 |
| 7,446,151 B2 | 11/2008 | Resendes et al. | |
| 2002/0107333 A1 | 8/2002 | Langstein et al. | |

FOREIGN PATENT DOCUMENTS

| | | |
|---|---|---|
| CA | 2204051 A1 | 2/1998 |
| CN | 102702409 A | 10/2012 |
| JP | H03166245 A | 7/1991 |
| WO | 2015032000 A1 | 3/2015 |

OTHER PUBLICATIONS

Wong, K.W. et al., "Impact of Elastomer Extractables in Pharmaceutical Stoppers and Seals—Material Supplier Perspectives", Rubber World Jun. 2009, vol. 240, No. 3, pp. 20-29.
Jenke, D. et al., "Extractables Characterization for Five Materials of Construction Representative of Packaging Systems Used for Parenteral and Opthalmic Drug Products", PDA Journal of Pharmaceutical Science and Technology, Oct. 1, 2013, vol. 67, No. 5, pp. 448-511.
Maurice Morton, Rubber Technology, $3^{rd}$ Edition; Van Nostrand Reinhold Company, (1987) pp. 297-300.

* cited by examiner

*Primary Examiner* — John E Uselding
(74) *Attorney, Agent, or Firm* — The Dobrusin Law Firm, P.C.

(57) ABSTRACT

A halogenated polyisoolefin copolymer is composed of at least one isoolefin monomer, at least one multiolefin monomer, a halogen content of 0.05-2.5 mol %, and a halogenated oligomer content of less than 65% of total oligomer content in the halogenated polyisoolefin copolymer. The copolymer has low halogen content and significantly reduced levels of halogenated oligomers. The copolymer is especially useful in the pharmaceutical and food industries, for example as pharmaceutical and food product seals and closures.

11 Claims, No Drawings

HALOGENATED POLYISOOLEFINS WITH REDUCED HALOGENATED OLIGOMERS

FIELD

This application relates to polyisoolefin copolymers, for example butyl rubber, in particular to halogenated polyisoolefin copolymers with reduced halogenated oligomer content and to processes for production thereof.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

U.S. Pat. No. 5,886,106 issued Mar. 23, 1999 describes a halogenated butyl rubber with a halogen content of 0.5-2.5% and a content of non-halogenated double bonds of greater than 0.7 mol %, but preferentially 0.7-1.0 mol % with an anti-agglomeration control agent (i.e. calcium stearate ($CaSt_2$)) in an amount of 1.25-2.2 wt %.

U.S. Pat. No. 7,446,151 issued Nov. 4, 2008 describes a process to produce high isoprene (IP) butyl rubber, specifically a polymer having a Mooney viscosity of at least 30 MU and a gel content of less than 15 wt % comprising repeating units derived from at least one isoolefin monomer, more than 4.1 mol % of repeating units derived from at least one multiolefin monomer and optionally further copolymerizable monomers.

In the production of butyl rubber, $C_{13}$ (1-isopropenyl-2,2,4,4-tetramethylcyclohexane, $C_{13}H_{24}$) and $C_{21}$ (1,1,5,5-tetramethyl-2-(1-methylethenyl)-3-(2,2,4-trim ethylpentyl)-cyclohexane, $C_{21}H_{40}$) cyclic oligomers having the structures C13 and C21 depicted below are produced. These cyclic oligomers are unsaturated, and halogenation of the butyl rubber also results in halogenation of the cyclic oligomers.

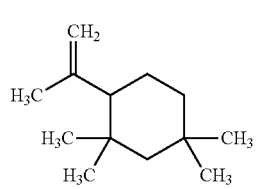

C13

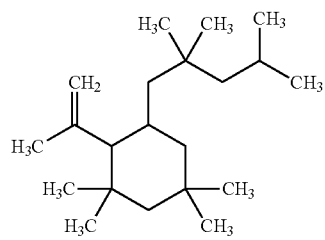

C21

Such cyclic oligomers, especially halogenated cyclic oligomers, are undesirable in certain applications, for example in pharmaceutical seals, closures, blood collection stoppers, medical devices and food grade applications, due to the potential for the halogenated cyclic oligomers to migrate into/onto the pharmaceutical or food product, and then interact with the product and/or be introduced into a patient. Therefore a reduction in halogenated cyclic oligomer levels in halogenated butyl rubber is desirable.

SUMMARY

There is provided a halogenated polyisoolefin copolymer comprising: at least one isoolefin monomer; at least one multiolefin monomer; a halogen content of 0.05-2.5 mol %; and a halogenated oligomer content of less than 65% of total oligomer content in the halogenated polyisoolefin copolymer.

There is further provided an article of manufacture comprising the polyisolefin copolymer described above.

There is further provided a process for producing a halogenated polyisoolefin copolymer comprising: copolymerizing a monomer mixture of at least one isoolefin monomer and 5-20 wt % of at least one multiolefin monomer, based on weight of the monomer mixture, in the presence of an initiator system to produce a polyisoolefin copolymer and oligomers; halogenating the polyisoolefin copolymer to produce a halogenated polyisoolefin copolymer having a halogen content of 0.05-2.5 mol % and a halogenated oligomer content of less than 65% of total oligomer content in the halogenated polyisoolefin copolymer; and, providing a stabilizer to the polyisoolefin copolymer and/or to the halogenated polyisoolefin copolymer, the stabilizer comprising a mixture of a LCST compound and a metal carboxylate, the metal carboxylate provided in an amount of 1.25 wt % or less based on weight of the copolymer.

The halogenated polyisoolefin copolymer is useful in the pharmaceutical and food industries, for example as pharmaceutical and food product seals and closures, and in medical devices. The pharmaceutical and food industries have a need for halogenated polyisoolefin copolymers with reduced levels of extractable components. Major extractable components from halogenated polyisoolefin copolymers that can affect pharmaceutical and/or food quality or compatibility are oligomers (with halogenated oligomers being of primary concern due to potential interaction with pharmaceuticals), stabilizers (e.g. calcium stearate ($CaSt_2$), epoxidized soybean oil (ESBO)), antioxidants (e.g. Irganox™ 1010, BHT) and solvent residues. The present invention permits reduction in one or more extractable components, especially halogenated oligomers.

Further features will be described or will become apparent in the course of the following detailed description. It should be understood that each feature described herein may be

DETAILED DESCRIPTION

The present invention provides a halogenated polyisoolefin copolymer having low halogen content and significantly reduced levels of halogenated oligomers. Lowering the halogen content of standard grades (i.e. grades with isoprene content of <2.4 mol %) results in a compound that cures slower, making it unsuitable from a production throughput perspective, and that has poorer compound properties. Tailoring the level of unsaturation (isoprene content) of the halogenated polyisoolefin copolymer provides additional crosslinking sites to improve rate and state of cure, thereby permitting reduction in the extent of halogenation required to achieve an acceptable rate and state of cure while reducing the levels of halogenated oligomers in the cured compound.

Thus, the halogenated polyisoolefin copolymer of the present invention comprises at least one isoolefin monomer, at least one multiolefin monomer, a halogen content of 0.05-2.5 mol %, and a halogenated oligomer content of less than 65% of total oligomer content in the halogenated polyisoolefin copolymer. The at least one multiolefin monomer is preferably in a range of about 2.4 mol % to about 10 mol %, or about 2.5 mol % to about 7.5 mol %, or about 2.6 mol % to about 5.0 mol %, or about 2.4 mol % to about 4.0 mol %, or about 3.1 mol % to about 3.65 mol %. The halogen content is preferably in a range of about 0.05-1 mol %, more preferably about 0.05-0.6 mol %, even more preferably about 0.1-0.5 mol %, yet more preferably about 0.15-0.49 mol %, even yet more preferably about 0.15-0.25 mol %. The halogenated polyisoolefin copolymer preferably comprises a content of non-halogenated double bonds in a range of about 2.5-4.5 mol %, preferably about 2.6-4.09 mol %. The halogenated oligomer content is preferably less than about 50% of total oligomer content in the halogenated polyisoolefin copolymer, more preferably less than about 45%, even more preferably less than about 40%, yet more preferably about 35% or less, even yet more preferably about 20% or less. The halogenated oligomer content may be as low as 15% or less, or 10% or less, or 5% or less, of total oligomer content in the halogenated polyisoolefin copolymer.

Halogenated polyisoolefin copolymers preferably comprise halobutyl polymers. A halobutyl polymer is derived from a butyl polymer, which is generally derived from at least one isoolefin monomer, at least one multiolefin monomer, and optionally further copolymerizable monomers.

The butyl polymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The butyl polymer is not limited to a special multiolefin. Every multiolefin copolymerizable with the isoolefin known by the skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, are used. Isoprene is more preferably used. The butyl polymer useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. The butyl polymer can include, for example, random copolymers of isobutylene, isoprene and para-methyl styrene.

The butyl polymer is formed by copolymerization of a monomer mixture. Preferably, the monomer mixture comprises about 80-98 mol % of at least one isoolefin monomer and about 2-20 mol % of at least one multiolefin monomer, based on the monomers in the monomer mixture. More preferably, the monomer mixture comprises about 92.5-97.5 mol % of at least one isoolefin monomer and about 2.5-7.5 mol % of at least one multiolefin monomer. Most preferably, the monomer mixture comprises about 97.4-95 mol % of at least one isoolefin monomer and about 2.6-5 mol % of at least one multiolefin monomer.

If the monomer mixture comprises the optional monomer copolymerizable with the isoolefins and/or dienes, the optional monomer preferably replaces a portion of the multiolefin monomer. The monomer mixture may also comprise from 0.01% to 1% by weight of at least one multiolefin cross-linking agent, and when the multiolefin cross-linking agent is present, the amount of multiolefin monomer is reduced correspondingly.

The butyl polymer is formed by copolymerization of a monomer mixture, for example by solution polymerization. A solution polymerization reaction is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBri_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

One or more other catalysts useful in solution copolymerization of isoolefins may also be present in the initiator system, for example titanium tetrachloride, stannous tetrachloride, boron trifluoride, boron trichloride, or methylalumoxane. The monomers are generally polymerized cationically, preferably at temperatures in the range of from about −100° C. to about −50° C., preferably in the range of from about −95° C. to about −65° C. The temperature is preferably about −80° C. or greater.

The solution comprises 0-30 vol % of an aliphatic hydrocarbon diluent, based on volume of the solution. In preferred embodiments, the solution comprises 0.1-30 vol % or 0.1-20 vol % of the aliphatic hydrocarbon diluent. The aliphatic hydrocarbon may be in a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane. The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are inert under reaction conditions.

The copolymerization process may be performed as a batch process in a batch reactor or a continuous process (e.g. a plug flow process) in a continuous reactor. In a continuous process, the process is preferably performed with at least the following feed streams: solvent/diluent+isoolefin (preferably isobutene)+multiolefin (preferably diene, isoprene); initiator system; and, optionally, a multiolefin cross-linking agent.

It should be noted that the multiolefin crosslinking agent can also be added in the same feed stream as the isoolefin and multiolefin. While cross-linking agents are not necessary to increase molecular weight of the copolymer to a processable level, cross-linking agents may nevertheless be used if desired.

To form the halobutyl polymer, the butyl polymer can then be subjected to a halogenation process. Bromination or chlorination can be performed according to a process known by those skilled in the art, for example, the procedures described in Rubber Technology, 3rd Ed., Edited by Maurice Morton, Kluwer Academic Publishers, pp. 297-300 and further documents cited therein. Preferably, halogenation is performed according to a process as described in U.S. Pat. No. 5,886,106 issued Mar. 23, 1999, the contents of which is herein incorporated by reference. The amount of halogenating agent added is controlled to provide a final halogen content of 0.05-2.5 mol % in the halobutyl polymer. Halogenation agents useful for halogenating butyl polymer may comprise elemental chlorine ($Cl_2$) or bromine ($Br_2$) and/or organo-halide precursors thereto, for example dibromo-dimethyl hydantoin, tri-chloro isocyanuric acid (TCIA), n-bromosuccinimide, or the like. Preferably, the halogenation agent comprises or is bromine. Preferably, halogenation comprises bromination.

During halogenation of a butyl polymer containing conjugated dienes, such as isoprene, some or all of the multiolefin content of the butyl polymer is converted to allylic halides. The total allylic halide content of the halobutyl polymer may not exceed the starting multiolefin content of the parent butyl polymer. The allylic halide sites allow for reacting with and attaching a nucleophile to the halobutyl polymer. For halobutyl polymers containing no allylic halides, for example, halobutyl polymers derived from isobutylene and styrenic monomers, benzylic halides, formed by halogenation of the styrenic monomer, may be reacted to form the ionomer rather than allylic halides. The same logic would therefore apply to benzylic halides as allylic halides; the total amount of ionomeric moieties cannot exceed the available amount of benzylic halides.

Optionally, in the case of halobutyl polymer, allylic halide or benzylic halide sites of the halobutyl polymer may be reacted with at least one nitrogen or phosphorus containing nucleophile to form a butyl ionomer. The nitrogen or phosphorus containing nucleophile may have the following formula,

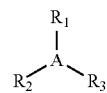

wherein:

A is a nitrogen or phosphorus; and,

R1, R2 and R3 are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, triphenylphosphine 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy)ethyl]amine, and 3-(dibenzylamino)-1-propanol and mixtures thereof.

The amount of nucleophile reacted with the butyl polymer may be in the range of from 0.05 to 5 molar equivalents, more preferably 0.5 to 4 molar equivalents and even more preferably 1 to 3 molar equivalents based on the total molar amount of allylic or benzylic halide present in the halobutyl polymer.

The halobutyl polymer and the nucleophile can be reacted for about 0.5 to 90 minutes. When the reaction takes place in an extruder, the reaction is preferably from 10 to 120 seconds minutes, more preferably from 20 to 60 seconds. When the reaction takes place in an internal mixer, the reaction is preferably from 1 to 15 minutes, more preferably from 1 to 4 minutes. In other cases, the reaction takes considerably longer, for example from greater than 15 to 90 minutes, preferably 20 to 60 minutes. A temperature range of 80 to 200° C. is desirable.

As stated above, the nucleophile reacts with the allylic or benzylic halide functionality of the halobutyl polymer resulting in units of ionomeric moieties where the allylic or benzylic halide functionality existed on the halobutyl polymer. The total content of ionomeric moiety in the butyl ionomer may not exceed the starting amount of allylic or benzylic halide in the halobutyl polymer; however, residual allylic halides, benzylic halides and/or residual multiolefins may be present. In embodiments of the present invention where substantially all of the allylic or benzylic halides sites are reacted with the nucleophile, a butyl ionomer is formed. In embodiments where less than all the allylic or benzylic halide sites are reacted with the nucleophile, a partially halogenated butyl ionomer is formed.

The resulting ionomers preferably possess at least 0.5 mol %, preferably at least 0.75 mol %, more preferably at least 1.0 mol %, yet more preferably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

One or more stabilizers and/or antioxidants may be employed with the halogenated polyisoolefin copolymer. Stabilizers and/or antioxidants may be introduced to the copolymer after halogenation, and before or after subsequent compounding with a cure system and auxiliary products. The one or more stabilizers are preferably acid scavengers and/or antiagglomerants. Stabilizers are capable of reacting with hydrogen halide. Useful stabilizers include, for example, metal carboxylates, epoxides, metal oxides, metal hydroxides inorganic salts of strong bases and weak acids, LCST compounds or mixtures thereof. Antioxidants prevent polymer degradation due to oxidation by atmospheric oxygen and other oxidant sources. Useful antioxidants include, for example, sterically hindered phenolics (e.g. Irganox™ 1076 (benzenepropanoic acid), Irganox™1010, pentaerythritol tetrakis(3-(3,5-di-tert-butyl-4-hydroxyphenyl)propionate)), condensation products of acetone and diphenylamine, p-phenylene, butylated hydroxytoluene (BHT) and the like.

For metal carboxylate stabilizers, the metal portion of the metal carboxylate can be monovalent or multivalent. In one embodiment the metal ion may be an alkali or alkaline earth metal ion, for example sodium, potassium, magnesium or calcium. In another embodiment, a transition metal ion, particularly of a first row transition metal (e.g. Zn), may form the metal ion. The carboxylic acid from which the carboxylate is derived can be mono- or poly-carboxylic acids (e.g. fatty acids). Thus, suitable mono-carboxylic acids are the $C_4$ to $C_{20}$ mono-carboxylic acids such as caproic, caprylic, pelargonic, myristic, palmitic, oleic, stearic and 2-ethyl hexanoic acids. Also suitable is naphthenic acid. Particularly preferred metal carboxylates comprise calcium stearate ($CaSt_2$), calcium palmitate, zinc stearate or zinc palmitate.

Suitable epoxide stabilizers are the products formed by epoxidizing esters and glycerides of $C_8$-$C_{24}$ unsaturated fatty acids, for example esters found in soybean oil, castor oil, linseed oil, safflower oil, etc. Preferred specific polyethers of this class include epoxidized soybean oil (ESBO) and epoxidized linseed oil (sold under the trademarks Drapex™ 6.8 and Drapex™ 10.4, respectively). Other suitable epoxides are monomeric low molecular weight, e.g., $C_2$-$C_7$, monofunctional epoxides, such as ethylene epoxide, propylene epoxide, butylene epoxide, etc. Preferred low molecular weight monofunctional epoxides include ethylene epoxide, propylene epoxide and butylene epoxide. Also suitable are aryl substituted alkyl epoxide, for example 1,2-epoxyethylbenzene, i.e., styrene epoxide.

Metal oxide or hydroxide stabilizers include those wherein the metal is selected from Group IIA of the Periodic Table. Particularly suitable are $Ca(OH)_2$, CaO, $Mg(OH)_2$, MgO, and hydrotalcite (e.g. Hycite™, DHT4A). Suitable examples of inorganic salts of strong bases and weak acids include carbonates and bicarbonates of sodium, potassium and calcium.

LCST compounds useful as stabilizers are compounds which are soluble in a liquid medium at a lower temperature but precipitate from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006). This temperature is characteristic for a particular substance and a particular method. Depending on the nature of the LCST compound, which typically comprises hydrophilic and hydrophobic groups, the determination of the cloud point may require different conditions as set forth in DIN EN 1890 of September 2006. Even though this DIN was originally developed for non-ionic surface active agents obtained by condensation of ethylene oxide this method allows determination of cloud points for a broad variety of LCST compounds as well. However, adapted conditions were found helpful to more easily determine cloud points for structurally different compounds. Therefore the term LCST compound as used herein covers all compounds where a cloud point of 0 to 100° C., preferably 5 to 100° C., more preferably 15 to 80° C. and even more preferably 20 to 80° C. can be determined by at least one of the following methods:

1) DIN EN 1890 of September 2006, method A;
2) DIN EN 1890 of September 2006, method C;
3) DIN EN 1890 of September 2006, method E;
4) DIN EN 1890 of September 2006, method A wherein the amount of compound tested is reduced from 1 g per 100 ml of distilled water to 0.05 g per 100 ml of distilled water; and,
5) DIN EN 1890 of September 2006, method A wherein the amount of compound tested is reduced from 1 g per 100 ml of distilled water to 0.2 g per 100 ml of distilled water.

In another embodiment the cloud points indicated above can be determined by at least one of the methods 1), 2) or 4). As a consequence, non-LCST compounds are in general those compounds having either no cloud point or a cloud point outside the scope as defined hereinabove. It is apparent to those skilled in the art and known from various commercially available products, that the different methods described above may lead to slightly different cloud points. However, the measurements for each method are consistent and reproducible within their inherent limits of error and the general principle of is not affected by different LCST temperatures determined for the same compound as long as with at least one of the above methods the cloud point is found to be within the ranges set forth above.

Some examples of LCST compounds include poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly (N,N-diethylacrylamide), poly[2-(dimethylamino)ethyl methacrylate], poly(2-oxazoline) glycopolymers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

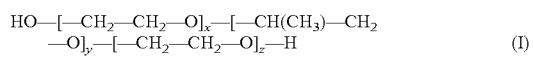
(I)

where y=3 to 10 and x and z=1 to 8, whereby y+x+z is from 5 to 18,
polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl, diethyl ether with 4 to 50, preferably 4 to 20 propyleneglycol units and mixtures thereof. Methyl cellulose, hydroxypropyl cellulose, hydroxyethyl methylcellulose, hydroxypropyl methylcellulose and mixtures thereof are particularly preferred.

The stabilizer should be present in an amount which is effective to react with the hydrogen halide by-product formed during halogenation, taking into consideration reaction kinetics, e.g., temperature in the region in which the stabilizer must react, the time available for the reaction compared to the potential for the acid halide to cause an undesirable side reaction (e.g. addition or degradation or isomerization), the use of additional means to remove hydrogen halide from the process (e.g., gas scrubbing, particularly in a process for halogenation of neat polymer), etc. Some limited experimentation, well within the skill of those in the art, will readily determine the effective amount of stabilizer to be used in the particular circumstances at hand. As a general guide it will be recognized that in the absence of other means of removing hydrogen halide (e.g., gas scrubbing), one equivalent of stabilizer is required at equilibrium per equivalent of hydrogen halide generated, but that as a practical matter up to about two to three times the theoretical amount can be used effectively. Where supplementary means are provided for hydrogen halide removal or where the effect of the hydrogen halide on the polymer is not particularly negative, as little as one-half or one-quarter the theoretical amount can be used effectively.

Metal carboxylates are particularly useful stabilizers for butyl polymers. However, the presence of a metal carboxylate can negatively impact cure rate and/or state and a metal carboxylate is an undesirable extractable in pharmaceutical and food applications of the cured copolymer. In the present invention, LCST compounds may be added into the production process as stabilizers in lieu of metal carboxylate, especially when the copolymer is to be cured with a resin cure system. This permits the use of less metal carboxylate during resin curing of the copolymer. The amount of metal carboxylate stabilizer needed when used in conjunction with a LCST compound stabilizer may be as low as about 1.25 wt % or less, based on weight of the copolymer. However, in some circumstances when LCST compounds are used in lieu of metal carboxylates, not all of the metal carboxylate may be replaced and a minimum of about 0.2 wt % of metal carboxylate may be needed. Preferably, the amount of metal carboxylate used as a stabilizer when LCST compounds are also used as stabilizers is in a range of about 0.2-1.24 wt %, more preferably about 0.5-1.24 wt %. Reduction in the amount of metal carboxylate provides less extractable impurities, which is beneficial for applications of the halogenated polyisoolefin copolymer in the pharmaceutical and food industries.

The halogenated polyisoolefin copolymer may be compounded with various auxiliary products, shaped into an article, and the resulting halogenated polyisoolefin compound cured. Auxiliary products for polymers (e.g. rubbers) include, for example, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry.

The rubber aids are used in conventional amounts that depend, inter alia, on the intended use. Further information on vulcanization may be obtained in Encyclopedia of Polymer Science and Engineering, Vol. 17, s. 666 et seq. (Vulcanization).

In a particular embodiment, the halogenated polyisoolefin copolymer may be compounded with a suitable filler (e.g. mineral and/or non-mineral fillers) to enhance certain desirable physical properties, such as tensile strength, viscosity, hardness, permeability, etc. Suitable fillers are selected from those that do not impart undesirable residues or otherwise adversely affect the polymer for use in the aforementioned "clean" applications. Examples of suitable fillers include silica, silicates, high aspect ratio or nano-sized versions thereof, and other suitable clean fillers. The selection of filler for imparting desired physical properties while retaining clean characteristics is within the purview of persons skilled in the art. Conventional amounts of fillers are from about 1 to 150 phr (parts per hundred rubber).

The halogenated polyisoolefin compound may be cured by any suitable method, for example sulfur-based curatives, peroxide-based curatives, ZnO curatives, resin cure systems or UV light. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide. In some embodiments of a resin cure system, the resin cure system may comprise a halogenated phenol formaldehyde resin or a phenol formaldehyde resin, optionally in conjunction with an activator. Halogenated phenol formaldehyde resins and phenol formaldehyde resins are known in the art as described in U.S. Pat. Nos. 2,701,895, 3,093,613 and 3,165,496, which are herein incorporated by reference. An alkyl phenol-formaldehyde derivative, for example octylphenol-formaldehyde with methylol active group, is typical. Metal oxides, for example zinc oxide, and/or other curing or processing aids (e.g. stearic acid) may also be used in the resin cure system. Metal oxides may be used in the amount of from about 1 to about 10 parts by weight per hundred parts by weight polymer in the composition. Resin may be used in amounts of from about 0.2 to about 20 phr. Other curing or processing aids may be used in amounts of from about 0.2 to about 10 phr.

The halogenated polyisoolefin copolymer is useful in various products including inner liners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing, appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

The halogenated polyisoolefin copolymer is particularly useful in the pharmaceutical and food industries, for example as pharmaceutical and food product seals and closures, and in medical devices. For example, the halogenated polyisoolefin copolymer and the cured articles made therefrom may be used as components of pharmaceutical containers, such as closures for parenteral (I.V.) vials, closures for injection vials, closures for vials containing freeze dried pharmaceutical products, closures for blood collection tubes or other diagnostic tubes, closures for infusion containers, closures for insulin containers, closures for dental anesthetic containers, plungers and plunger tips for syringes, discs and gaskets, intravenous drug delivery components, seals for pre-filled syringes, seals for infusion pumps, seals for inhalers, and like applications. Additionally, the halogenated polyisoolefin copolymer and the cured article may be used in medical devices, objects with food and drink contact, such as seals and gaskets in bottle caps, objects or components of objects used in cell and tissue culture. Furthermore, the halogenated polyisoolefin copolymer may be used as an elastomer in gum base in the production of chewing gum.

EXAMPLES

Materials and Methods

LANXESS X_Butyl™ BB2030 (LANXESS Corp.) with a halogen content of about 1.8 wt % and an isoprene content of less than about 2.2 mol %. Glomax™ LL (Imerys), Zinc Oxide (Horsehead Corp), Polyethylene AC-617A (Canada Colors Chemicals LTD.), SP 1045 (Schenectady Chemicals), and stearic acid (H.M. Royal) were used as received from their respective suppliers.

All compounds were cured at 180° C. for either t'90+5 minutes or t'90+10 minutes as determined by MDR (ASTM D5289). Stress strain properties were determined according to ASTM D412 using Die C dumbbells with samples cured at t'90+5 minutes. Mooney viscosity was measured using ASTM D1646 at 100° C. Compression set was determined according to ASTM D395 with samples cured at t'90+10 minutes. Halogenated oligomer content was determined via HPLC and reactive bromine and total isoprene was determined via 1H NMR.

Example 1: Production of Butyl Rubber (IIR)

This example illustrates the production of, via a continuous process, a novel grade of IIR possessing an isoprene content of up to 4.0 mol % and Mooney viscosity (ML 1+8 @ 125° C.) of 36±5 MU. The monomer feed composition contained 1.65-2 wt % of isoprene and 28.4-27.7 wt % of isobutene. This mixed feed was introduced into a continuous polymerization reactor at a rate of 5900 kg/hour. Polymerization was initiated via the introduction of an AlCl$_3$/MeCl solution (0.23 wt % of AlCl$_3$ in MeCl) at a rate of 204 to 227 kg/hour. Internal temperature of the continuous reaction was maintained between −95 and −100° C. through the use of an evaporative cooling process. Following sufficient residence within the reactor, the newly formed polymer crumb was separated from the MeCl diluent with the use of an aqueous flash tank. At this point, ca. 1 wt % of stearic acid was introduced into the polymer crumb. Prior to drying, 0.1 wt % of Irganox™ 1010 antioxidant was added to the polymer. Drying of the resulting material was accomplished with the use of a conveyor oven. Table 1 details characteristics of the butyl rubber material.

TABLE 1

| | |
|---|---|
| Total Unsaturation (mol %) | 4.0 |
| Mooney viscosity (MU, ML1 + 8 @ 125° C.) | 36 |
| $M_w$ (kg/mol) | 450-550 |
| $M_n$ (kg/mol) | 150-180 |

Examples 2-7: Production of Brominated IIR

This example illustrates bromination of the butyl rubber produced in Example 1. Elemental bromine was added to a solution of 250 g of Example 1 in 2500 mL of hexanes and 250 mL of water in a 5 L reactor with rapid agitation. After 5 minutes, the reaction was terminated via the addition of a NaOH solution and 500 mL of water. Following an additional 20 minutes of agitation and water washed, a stabilizer solution of epoxidized soya-bean oil in hexanes as well as Irganox™ 1076 was added to the reaction mixture, followed by isolation of the brominated polymer by steam coagulation. The brominated butyl rubber was dried to a constant weight with the use of a two roll 6"×12" mill operating at 100° C. The resulting properties are shown in Table 2. Table 2 illustrates a significant reduction in brominated cyclic oligomer content across Examples 2-7 in comparison to a commercial brominated butyl rubber, BB2030.

TABLE 2

| | | | | Cyclic Oligomers | |
|---|---|---|---|---|---|
| | Bromine Addition (mL) | Total isoprene (mol %) | Reactive Bromine (mol %) | Brominated (% of total) | Non-Brominated (% of total) |
| Example 2 | 0.26 | 3.62 | 0.16 | 2 | 98 |
| Example 3 | 0.80 | 3.13 | 0.23 | 4 | 97 |
| Example 4 | 0.67 | 3.48 | 0.27 | 17 | 84 |
| Example 5 | 1.34 | 3.22 | 0.4 | 24 | 77 |
| Example 6 | 2.01 | 2.94 | 0.59 | 29 | 71 |
| Example 7 | 2.7 | 2.64 | 0.79 | 35 | 65 |
| LANXESS BB2030 | n/a | 1.73 | 0.79 | 84 | 16 |

Example 8: Resin Curing of BB2030

BB2030 (100 phr) was charged to a Brabender internal mixer (60° C., 60 rpm) and masticated for 60 seconds at which point Glomax™ LL (85 phr), Polyethylene AC-617A (2 phr) and stearic acid (1.5 phr) were added. After 4 min, zinc oxide (3 phr) and SP1045 (1.25 phr) were added with mixing continuing for an additional 2 min. The resulting compound was refined on the mill and test samples cured at 200° C. with the resulting properties summarized in Table 3. Glomax™ LL is dehydroxylated aluminum silicate, a filler to provide stiffness and dimensional stability. SP1045 is an octylphenol-formaldehyde with methylol active group and Polyethylene AC-617A is a low density polyethylene homopolymer.

Examples 9-13: Resin Curing of the Brominated IIR of Examples 2-7 with CaSt$_2$ Stabilizer Polymer (Examples 2-7, 100 phr) was added along with calcium stearate (0.2 phr) to a Brabender internal mixer (60° C., 60 rpm) and masticated for 60 seconds at which point Glomax™ LL (85 phr), Polyethylene AC-617A (2 phr) and stearic acid (1 phr) were added. After 4 min, zinc oxide (1 phr) and SP1045 (1.25 phr) were added with mixing continuing for an additional 2 min. The resulting compound was refined on the mill and test samples cured at 200° C. with the resulting properties summarized in Table 3. Table 3 illustrates that tensile strength, ultimate elongation, tensile stress at 100% elongation (M100) and hardness of the brominated butyl rubbers are comparable to that of the commercial butyl rubber, BB2030, indicating that the low halogen butyl rubbers of the present invention have appropriate physical properties for many applications of halogenated butyl rubbers. The low bromine butyl rubbers of Examples 9 and 10 are particularly interesting as these materials have extremely low levels of brominated oligomers (4% or less), while additionally improving compression set in comparison to BB2030 and increasing tensile stress at 300% elongation (M300), which would allow for the potential reduction in curatives.

TABLE 3

| | Polymer | Ultimate Tensile (MPa) | Ultimate Elongation (%) | M100 (MPa) | M300 (MPa) | Hardness (Pts) | Compression Set (%) |
|---|---|---|---|---|---|---|---|
| Example 8 | BB2030 | 6.4 | 841 | 1.1 | 1.6 | 45 | 42 |
| Example 9 | Example 2 | 4.3 | 1016 | 0.8 | 1.4 | 43 | 37 |
| Example 10 | Example 3 | 5.8 | 908 | 1.1 | 1.8 | 46 | 29 |
| Example 11 | Example 4 | 6 | 781 | 1.4 | 2.5 | 49 | 30 |
| Example 12 | Example 5 | 5.6 | 662 | 1.7 | 3.2 | 51 | 29 |
| Example 13 | Example 6 | 4.8 | 563 | 1.7 | 3.1 | 52 | 30 |

Examples 14-15: Resin Curing of the Brominated IIR of Examples 2-3 without CaSt₂

Polymer (Examples 2-3, 100 phr) was added to a Brabender internal mixer (60° C., 60 rpm) and masticated for 60 seconds at which point Glomax™ LL (85 phr), Polyethylene AC-617A (2 phr) and stearic acid (1 phr) were added. After 4 min, zinc oxide (1 phr) and SP1045 (1.25 phr) were added with mixing continuing for an additional 2 min. The resulting compound was refined on the mill and test samples cured at 200° C. with the resulting properties summarized in Table 4.

TABLE 4

| | Polymer | Ultimate Tensile (MPa) | Ultimate Elongation (%) | M100 (MPa) | M300 (MPa) | Hardness (Pts) | Compression Set (%) |
|---|---|---|---|---|---|---|---|
| Example 8 | BB2030 | 6.4 | 841 | 1.1 | 1.6 | 45 | 42 |
| Example 14 | Example 2 | 4.5 | 616 | 1.3 | 1.7 | 51 | 28 |
| Example 15 | Example 3 | 2.9 | 321 | 1.8 | 2.8 | 56 | 32 |

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A process for producing a halogenated polyisoolefin copolymer, the process comprising:
   copolymerizing a monomer mixture of at least one isoolefin monomer and 5-20 wt % of at least one multiolefin monomer, based on weight of the monomers in the monomer mixture, in the presence of an initiator system to produce a polyisoolefin copolymer and oligomers;
   halogenating the polyisoolefin copolymer to produce a halogenated polyisoolefin copolymer having a halogen content of 0.05-2.5 mol % and a halogenated oligomer content of less than 65% of total oligomer content in the halogenated polyisoolefin copolymer; and,
   providing a stabilizer to the polyisoolefin copolymer and/or to the halogenated polyisoolefin copolymer, the stabilizer comprising a mixture of a lower critical solution temperature (LCST) compound and a metal carboxylate, the metal carboxylate provided in an amount of 1.25 wt % or less based on a weight of the copolymer.

2. The process according to claim 1, wherein the LCST compound is selected from the group consisting of poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly (N,N-diethylacrylamide), poly[2-(dimethylamino)ethyl methacrylate], poly(2-oxazoline) glycopolymers, poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, compounds of formula (I)

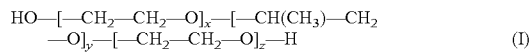

$$HO-[-CH_2-CH_2-O]_x-[-CH(CH_3)-CH_2-O]_y-[-CH_2-CH_2-O]_z-H \quad (I)$$

where y=3 to 10 and x and z=1 to 8, whereby y+x+z is from 5 to 18, polyethyleneglycol-co-polypropylene glycol, ethoxylated iso-$C_{13}H_{27}$-alcohols, polyethylene glycol with 4 to 50 ethyleneglycol units, polypropylene glycol with 4 to 30 propyleneglycol units, polyethylene glycol monomethyl, dimethyl, monoethyl or diethyl ether with 4 to 50 ethyleneglycol units, polypropylene glycol monomethyl, dimethyl, monoethyl or diethyl ether with 4 to 50 propyleneglycol units or mixtures thereof.

3. The process according to claim 1, wherein the metal carboxylate comprises calcium stearate.

4. The process according to claim 1, wherein the stabilizer is provided to the halogenated polyisoolefin copolymer after halogenation of the polyisoolefin copolymer.

5. The process according to claim 1, wherein the monomer mixture comprises 2-20 mol % of the at least one multiolefin monomer.

6. The process according to claim 1, wherein the halogenated oligomer content is 50% or less of total oligomer content in the halogenated polyisoolefin copolymer.

7. The process according to claim 1, wherein:
   the at least one isoolefin monomer comprises isobutene;
   the at least one multiolefin monomer comprises isoprene;
   the halogenating comprising brominating the polyisoolefin copolymer to produce a brominated polyisoolefin copolymer having a bromine content of 0.05-2.5 mol % and a brominated oligomer content of less than 65% of total oligomer content in the brominated polyisoolefin copolymer; and
   the metal carboxylate is in an amount of 0.5-1.24 wt % based on weight of the copolymer.

8. The process according to claim 1, wherein the metal carboxylate is provided in an amount of 0.2-1.24 wt % based on weight of the copolymer.

9. The process according to claim 1, wherein the metal carboxylate is provided in an amount of 0.5-1.24 wt % based on weight of the copolymer.

10. The process according to claim 1, wherein the monomer mixture comprises 2.5-7.5 mol % of the at least one multiolefin monomer.

11. The process according to claim 1, wherein the halogenated oligomer content is 20% or less of total oligomer content in the halogenated polyisoolefin copolymer.

* * * * *